Nov. 3, 1964   M. C. UDY   3,155,492
METALLURGICAL PROCESS
Filed March 18, 1963
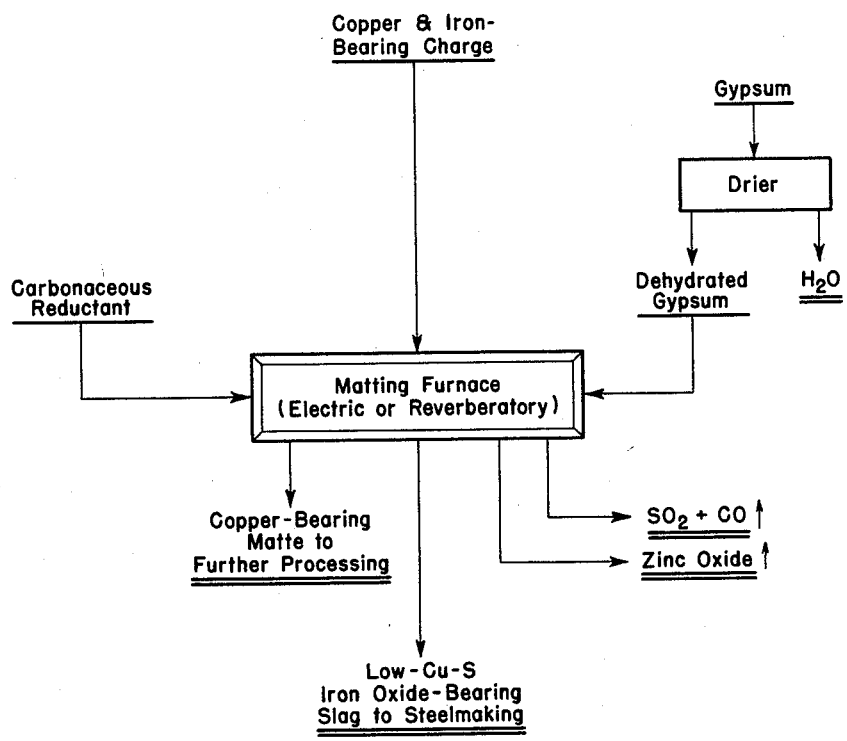
INVENTOR.
Murray C. Udy
BY
Charles J. Elderkin
ATTORNEY

3,155,492
METALLURGICAL PROCESS

Murray C. Udy, Niagara Falls, N.Y., assignor, by mesne assignments, to Independence Foundation, Philadelphia, Pa., a corporation of Delaware, and Koppers Company, Inc., Pittsburgh, Pa., a corporation of Delaware
Filed Mar. 18, 1963, Ser. No. 271,544
5 Claims. (Cl. 75—24)

This invention relates in general to metallurgy and more particularly to processes for making relatively low-grade complex materials amenable to recovery of their contained metallic values by established smelting procedures. The invention has for a specific object the provision of a unique process for treating low-grade iron ores and waste slags of types containing small but significant percentages of non-ferrous metals such as copper and zinc, so that both the copper and zinc may be recovered as separate products, and the iron values may be further treated to produce finished steel of low residual copper content.

The desirability of economically recovering the metals contained in complex waste slags and low-grade iron ores has long been recognized, and although a great variety of processes have been suggested for this purpose, few have effectively overcome the problems attendant to efficient separation of the ferrous and nonferrous constituents into usable products. While the nonferrous constituents of such materials most often are present in only relatively small percentages, their removal, and, preferably their recovery, is essential both from an economical standpoint and from the standpoint that their deleterious influence on the ferrous component increases materially as the latter metal is concentrated by separation from the gangue constituents. Thus, for example, a copper reverberatory slag might contain 33% iron and only 0.5% copper, but after removal of the other gangue constituents present in the slag, the resulting iron product would contain about 1.5% or more copper; a product having relatively little use in today's market for high-quality steels.

Most proposals heretofore suggested for the removal of copper and other nonferrous metals from iron-bearing materials proceed via a matting operation, and utilize pyrite or a similar addition agent to reduce out a substantial proportion of the nonferrous elements, along with a much larger proportion of the available iron. While this type of procedure is entirely satisfactory for some materials, it has the serious disadvantage of introducing substantial quantities of sulfur into the system which must be removed at a later stage of the recovery operation.

The present invention is based, in part, upon my discovery that calcium sulfate (commonly known as gypsum) will satisfactorily flux and matte a smelting operation of the general class described and, at the same time, not contaminate the resulting slag with sulfur. Thus, it has been found that by operating in an electric-arc or reverberatory furnace between 1400° and 1500° C. and with a base-to-acid ratio of approximately 1:1, approximately one-half of the contained sulfur of the calcium sulfate will be volatilized and leave the furnace as $SO_2$, and a substantial percentage of the remainder will pass into the matte along with the copper. On the other hand, the calcium content of this unique fluxing-matting agent will enter the slag phase, serving to flux the iron oxide values contained therein. Also, at the operating temperatures involved, the vapor pressure of zinc is sufficient to insure its removal, so that even at atmospheric pressure the zinc residue in the slag is not objectionable. The slag resulting from such a matting operation can be readily treated via reduction smelting to produce finished steel of low residual copper, zinc and sulfur contents.

Suitable starting materials for use in the process of the invention include copper smelter slags, nickel smelter slags, copper and nickel converted slags, and various iron ores of the sulfide and oxide types containing minor proportions of nonferrous metals. In general, the waste and converter slags contain copper in an amount well below 1%, zinc in the range of 2–3%, and iron ranging from 20% to 40%; the sulfur content usually being in excess of 1%. Typical sulfide ores may contain from one-half to several percent copper and up to 50% iron.

The following example, taken with reference to the flow diagram of the drawing, illustrates the application of the present invention to the production of a copper-bearing matte and an iron oxide-bearing slag suitable for further processing into finished steel from a typical waste copper reverberatory furnace slag.

Example

Approximately 2000 pounds of copper reverberatory slag from the Clarkdale, Arizona slag dump, suitably crushed, was charged into an electric-arc furnace. This slag had the following analysis of essential constituents:

| | Percent |
|---|---|
| Fe | 33.2 |
| Cu | 0.61 |
| $SiO_2$ | 36.13 |
| $Al_2O_3$ | 7.26 |
| CaO | 3.66 |
| MgO | 3.07 |
| Zn | 2.0 |
| S | 1.4 |

Previously, 1900 pounds of hydrated calcium sulfate ($CaSO_4 \cdot 2H_2O$) were dried in a drier at 200° C., driving off 400 pounds of water and leaving 1500 pounds of dedydrated calcium sulfate. This was added to the furnace charge, along with 250 pounds of a coal of 79% fixed carbon content. Smelting was commenced at between 1400° and 1500° C., and during the course of operation, the following constituents of the charge were volatilized and removed from the furnace in the gaseous state:

| | Pounds |
|---|---|
| $SO_2$ | 574 |
| CO | 460 |
| ZnO | 33 |

After matting was complete, the furnace was tapped and yielded 180 pounds of a low-grade matte with the following analysis of essential elements:

| | Percent |
|---|---|
| Cu | 6.2 |
| Zn | 1.1 |
| Fe | 64.0 |
| S | 27.5 |

The slag produced amounted to 2360 pounds and had the following analysis of essential elements:

| | Percent |
|---|---|
| Fe | 23.2 |
| Cu | 0.06 |
| $SiO_2$ | 30.5 |
| CaO | 29.3 |
| MgO | 2.6 |
| $Al_2O_3$ | 6.2 |
| S | 1.5 |
| Zn | 0.5 |

It can thus be seen that removal of both copper and zinc was most satisfactory, while at the same time there was no undue contamination of the iron-containing slag with sulfur.

The slag in question was further processed to finished steel, and proved entirely satisfactory for this purpose.

This application constitutes a continuation-in-part replacement of prior application Serial No. 35,679, filed June 13, 1960.

Having thus described the subject matter of my invention, what it is desired to secure by Letters Patent is:

1. Process for the beneficiation of iron-bearing waste slag materials containing zinc and copper that comprises, smelting said material in the presence of gypsum and a carbonaceous reductant at a temperature within the range of from 1400° to 1500° C. and with a base-to-acid ratio of approximately 1:1 to effect the production of a copper and zinc-bearing matte, gaseous products including sulfur dioxide and zinc oxide, and a residual iron oxide-bearing slag of relatively low copper and sulfur contents.

2. Process for the beneficiation of relatively low-grade iron ores containing copper that comprises, smelting said ore in the presence of gypsum sufficient to provide a base-to-acid ratio of approximately 1:1 and a carbonaceous reductant to effect production of a copper-containing matte and a substantially copper-free iron oxide-bearing slag.

3. Process for the beneficiation of low-grade iron ores containing copper that comprises, smelting said ore in the presence of gypsum sufficient to provide a base-to-acid ratio of approximately 1:1 and a carbonaceous reductant at a temperature within the range of from 1400° to 1500° C. to effect production of a copper-containing matte and a substantially copper-free iron oxide-bearing slag.

4. Process for the beneficiation of low-grade iron ores containing zinc and copper that comprises, smelting said ores in the presence of gypsum and a carbonaceous reductant at a temperature within the range of from 1400° to 1500° C. and with a base-to-acid ratio of approximately 1:1 to effect production of a copper and zinc-bearing matte, gaseous products including sulfur dioxide and zinc oxide, and iron oxide-bearing slag of low residual copper content.

5. Process for the beneficiation of iron-bearing waste slag material containing a significant proportion of sulfur and minor proportions of copper and zinc that comprises, smelting said material in the presence of a carbonaceous reductant and gypsum in an amount sufficient to provide a base-to-acid ratio of approximately 1:1, said gypsum functioning as a combined matting agent and fluxing agent to effect the production of a copper- and zinc-bearing matte, gaseous products including sulfur dioxide and zinc oxide, and a substantially copper- and zinc-free iron oxide-bearing slag of low residual sulfur content suitable for further processing for the production and recovery of finished steel.

No references cited